United States Patent
Kriefske et al.

[11] Patent Number: 6,153,033
[45] Date of Patent: Nov. 28, 2000

[54] LINER WITH INTEGRATED CABLE AND METHOD

[75] Inventors: Kris Kriefske, Rowlett; Pat Kamesch, Bedford, both of Tex.

[73] Assignee: Olympic General Corporation, Reno, Nev.

[21] Appl. No.: 09/222,410

[22] Filed: Dec. 29, 1998

Related U.S. Application Data

[62] Division of application No. 08/895,743, Jul. 17, 1997, Pat. No. 5,897,721.

[51] Int. Cl.[7] ................................................... B32B 31/00
[52] U.S. Cl. ......................... 156/70; 156/292; 156/308.4; 156/499; 156/544; 156/555
[58] Field of Search ........................ 156/70, 292, 308.2, 156/308.4, 499, 544, 555

[56] References Cited

U.S. PATENT DOCUMENTS

| | | | |
|---|---|---|---|
| 418,519 | 12/1889 | Johns . | |
| 2,282,168 | 5/1942 | Cunnington | 156/292 |
| 2,285,447 | 6/1942 | Lichter . | |
| 2,748,048 | 5/1956 | Russell | 156/292 |
| 2,767,113 | 10/1956 | Bower . | |
| 2,897,729 | 8/1959 | Ashton et al. | 156/70 |
| 3,284,267 | 11/1966 | Buck et al. | 156/70 |
| 3,546,764 | 12/1970 | Clapp | 156/544 |
| 4,447,288 | 5/1984 | Seaman | 156/574 |
| 4,744,855 | 5/1988 | Ellenberger et al. | 156/579 |
| 4,788,088 | 11/1988 | Kohl | 428/34.5 |
| 4,834,828 | 5/1989 | Murphy | 156/499 |
| 4,855,004 | 8/1989 | Chitjian | 156/499 |
| 4,872,941 | 10/1989 | Lippman et al. | 156/574 |
| 5,171,502 | 12/1992 | Iseki | 264/171 |
| 5,292,390 | 3/1994 | Burack et al. | 156/176 |
| 5,897,721 | 4/1999 | Kriofske et al. | 156/70 |

*Primary Examiner*—James Sells
*Attorney, Agent, or Firm*—Michael A. O'Neil

[57] ABSTRACT

Liners are typically formed by several sheets of liner material that are welded together along an edge. Securing a liner in place could be vastly improved if a cable could be fixed to the liner. Therefore, several methods of securing a cable to the liner have been disclosed. In one embodiment, a passage is placed into a hot shoe wedge welder used in welding the liner sheets together. A cable is fed through the passage as thus is captured between the two portions of adjacent sheets being welded together. The cable can be unsheathed or slidable within a sheath. In the later case, the sheath would be fixed between the welded sheets, but the cable would still be slidable within the sheath. A sheathed cable could also be attached to a liner by melting a portion of the sheath and a portion of the liner and then pressing the two together. A modified hot shoe could be used in that process as well. Finally, a cable can be placed onto a liner and a plastic bead applied over the cable, attaching it to the liner.

10 Claims, 10 Drawing Sheets

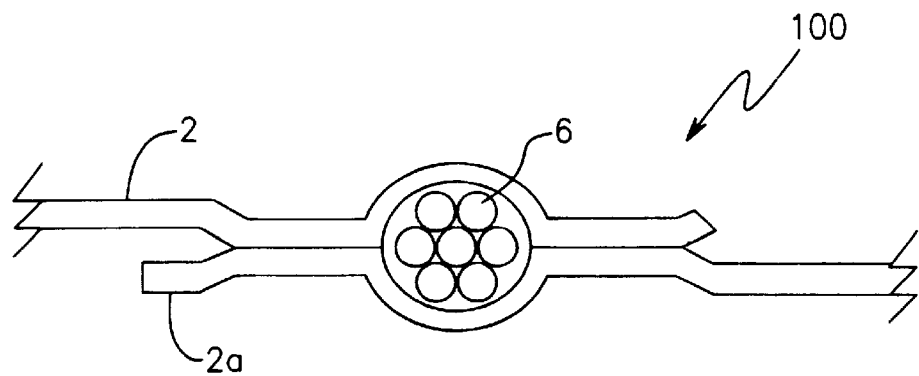
FIG. 6
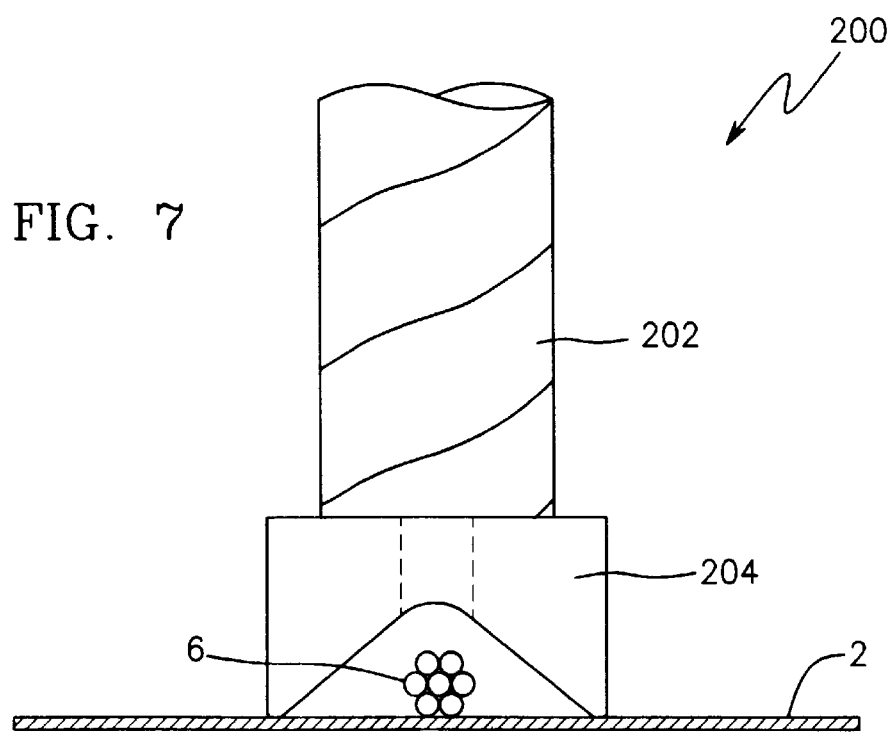
FIG. 7
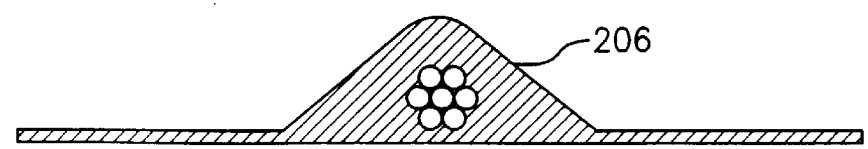

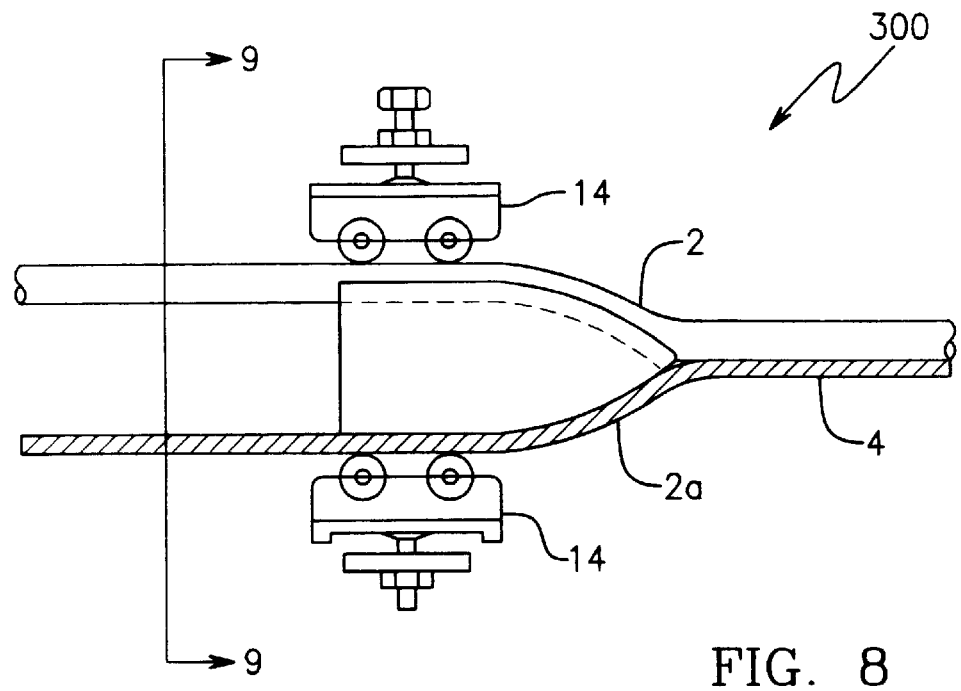
FIG. 8
FIG. 9
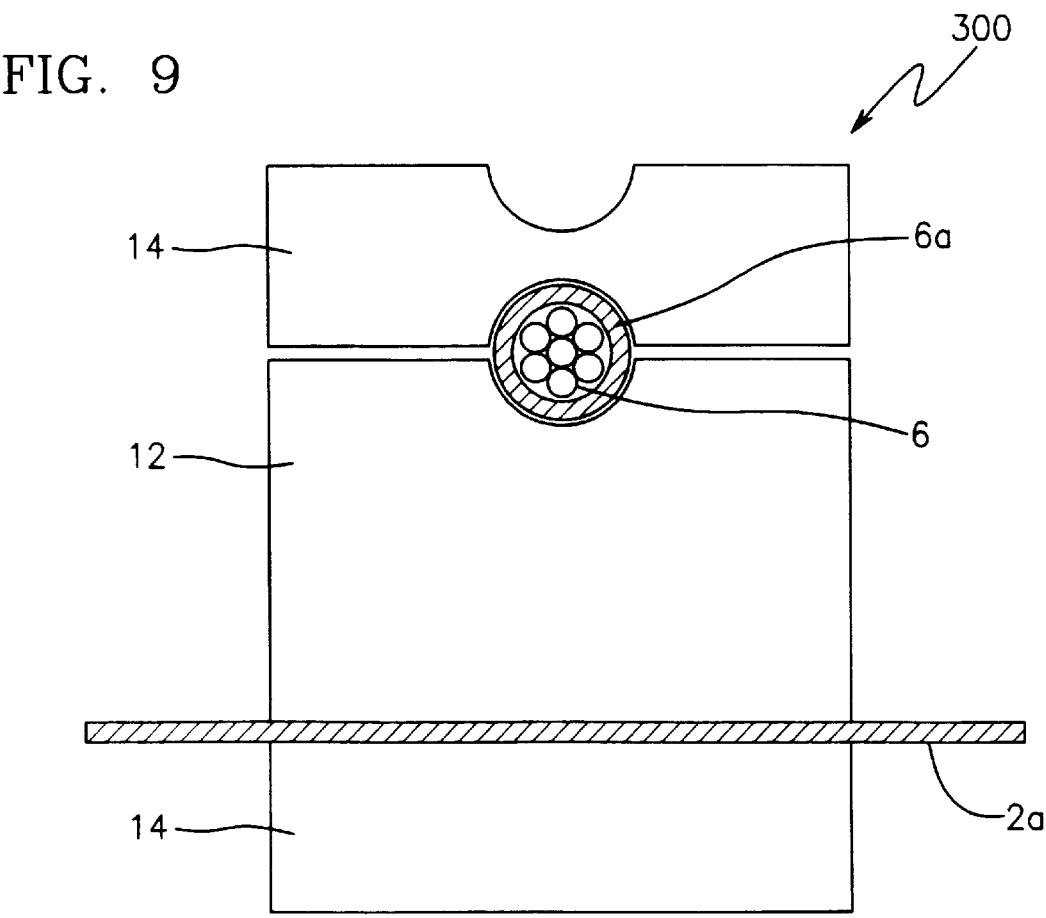

LINER WITH INTEGRATED CABLE AND METHOD

This application is a divisional application of U.S. patent application Ser. No. 08/895,743, filed Jul. 17, 1997, now U.S. Pat. No. 5,897,721, which is incorporated by reference for all purposes into this application.

BACKGROUND OF THE INVENTION

1. Field of the Invention

The present invention relates to a method of integrating a cable to a liner thereby providing the liner with a means to tie the liner to an anchor. The cable can be melded into the seam between two adjacent liners during the welding process.

2. Description of the Related Art

Polymer liners have found widespread use. Large sheets of liner can be used in hazardous waste pits to protect the underlying soil from contact with the waste. Alternatively, the liners can be used to protect water supplies from contaminants, prevent vector migration from waste water, keep animals out, contain gas from digesters, and so forth. When used for this purpose, the liners are floated on the surface of the liquid. Liners are also used to cover grain stockpiles, coal and other mineral stockpiles, and even as daily covers for landfills.

Liners are produced in rolls of limited width. It is rare that the manufactured liner is as wide as the area being covered. Therefore, techniques have been developed to weld adjacent sheets of liner together. FIGS. 1, 2, and 3 illustrate a prior art method of welding adjacent liner sheets. FIG. 1 illustrates a welding machine 10 used to weld overlapping sheets 2, 2a comprising adjacent (poly-flex liner) liners to produce a fusion-bonded poly-flex liner 7. A hot wedge or shoe 12 heats the sheets 2, 2a so that each has a slightly melted surface. These surfaces are then pressed together by (Nip/Drive) rollers 14, allowing them to bind together and cool producing a welded seam 4 between the adjacent sheets. The welding machine 10 is pulled along manually or can be mechanized. The (double) hot wedge (or shoe) 12, shown in perspective in FIG. 2, has a generally wedged form surface that can be heated. In the model shown, two ridges 12a, 12b contact the overlapping portions of adjacent liner. Thus, a double weld is produced, as shown in FIG. 3, with a central unwelded portion (or air channel), and a squeeze out 3.

Liners are subjected to wind uplift, lateral wind displacement, gas collection and inflation, storm water collection, snow loads, and other forces or combinations of the above forces which can cause significant stresses on the liner and its anchorage. Currently, these liners are held down by weighted plastic pipes, sandbags, tires tied to a rope lattice, sacks of concrete, and other passive methods. A need exists for a better way to secure welded liner in place.

SUMMARY

The present invention relates to a polyethylene liner having an integral cable for reinforcement and to facilitate anchoring of the liner. The cable can be attached to the liner by any of three basic methods. First, a plastic-jacketed cable can be directly welded onto a plastic strip or sheet. The cable is contained in a polyethylene sheathing of 60 to 100 mils and passes through a modified wedge welder such that the plastic jacket is fusion welded to a flat sheet. The cable can then be sheathed by a tube of plastic directly extruded onto a clean or greased cable, which can be inserted into a plastic tube.

Second, a bare cable can be fed through a hole in the hot shoe typically used to weld overlapping portions of adjacent liner sheet together. The cable is encased in a pocket, or "air channel," between the two sheets. Finally, a cable can be attached to a strip of plastic by a modified extrusion welder. The foot of the welder is shaped to allow an extrusion bead to completely encase the cable and to weld to the liner.

BRIEF DESCRIPTION OF THE DRAWINGS

The foreground aspects and other features of the present invention are explained in the following written description, taken in connection with the accompanying drawings, wherein:

FIG. 6 is a cross section of a liner having a cable integrated by a method illustrated in FIGS. 4 and 5.

FIG. 7 is an alternative embodiment of the present invention wherein a cable is fused to a liner with an extruded bead of polyethylene or the like.

FIGS. 8 and 9 illustrate an alternate embodiment of the present invention wherein a plastic sheathed cable is welded to a liner.

DETAILED DESCRIPTION OF THE INVENTION

Figure 1:
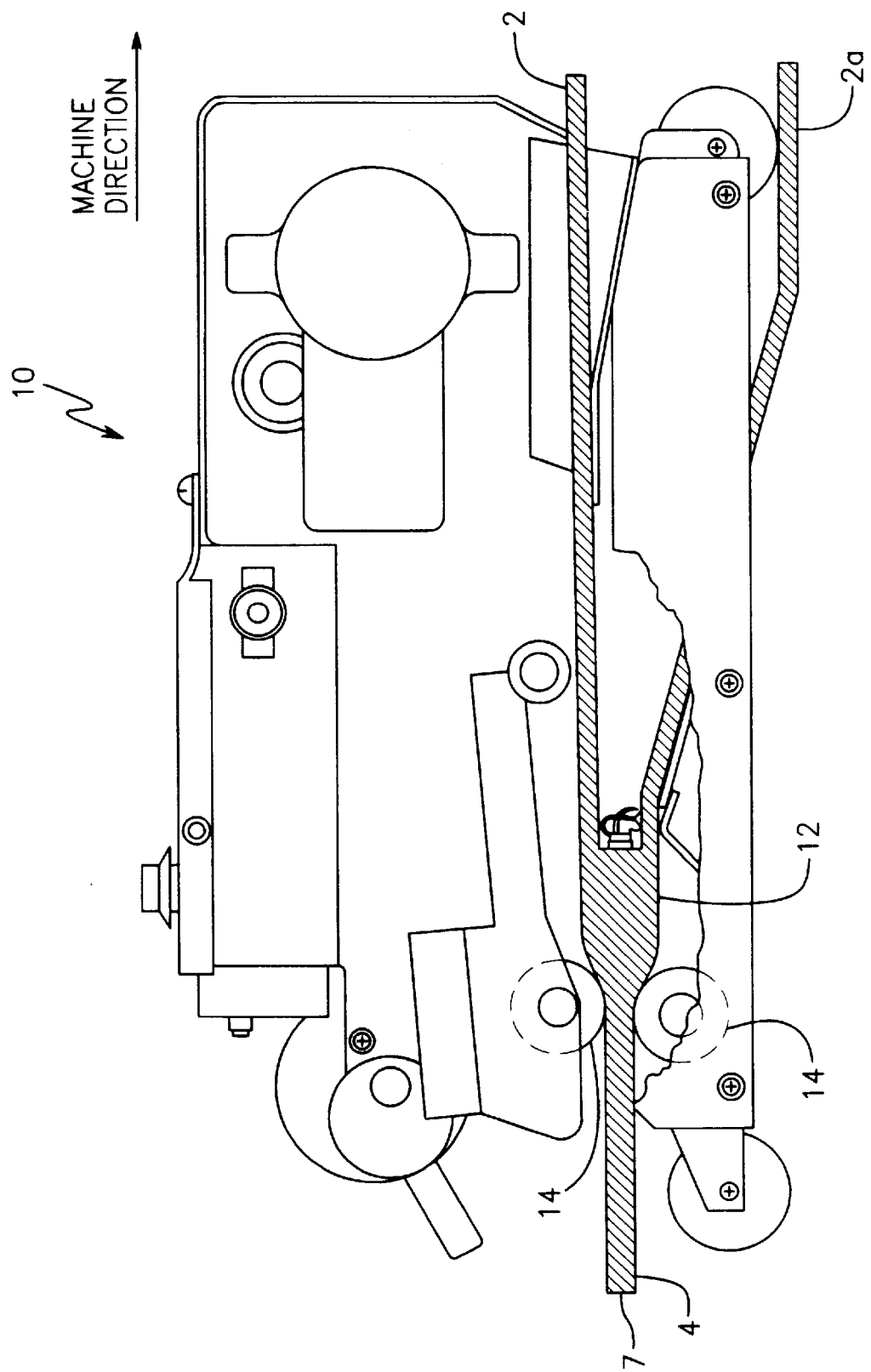
FIG. 1 is a side view of a prior art liner welding machine.
Figure 2:
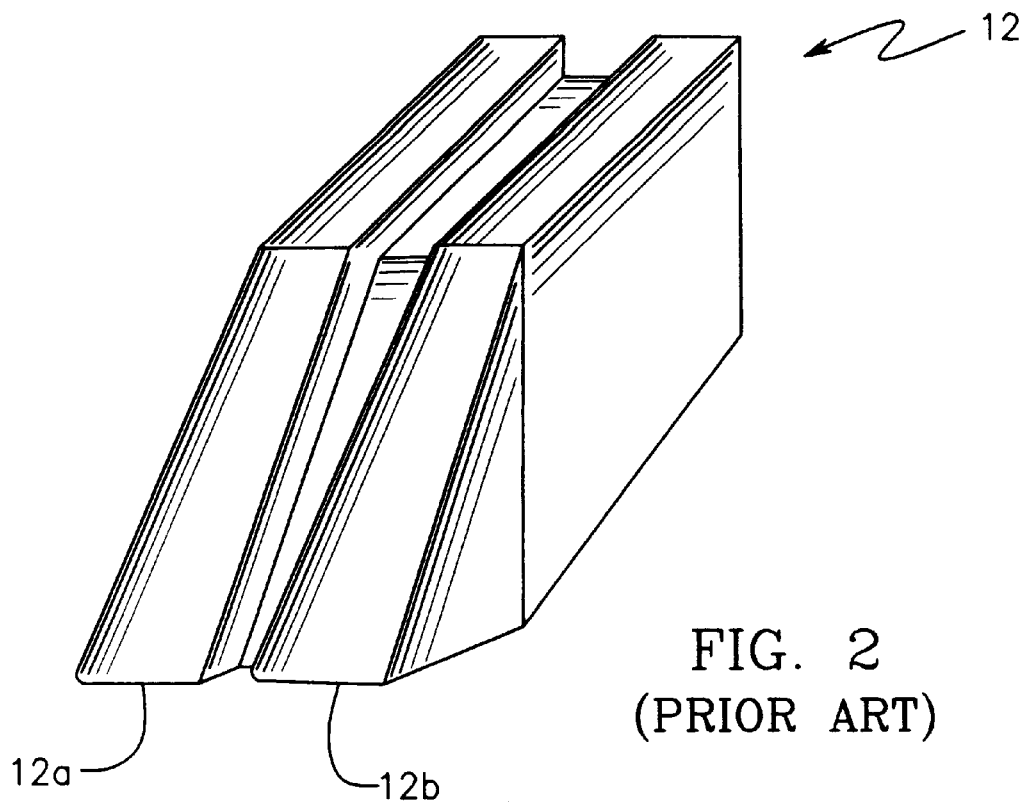
FIG. 2 is a perspective view of a hot shoe wedge welder used to melt the surface of overlapping portions of liner.
Figure 3:
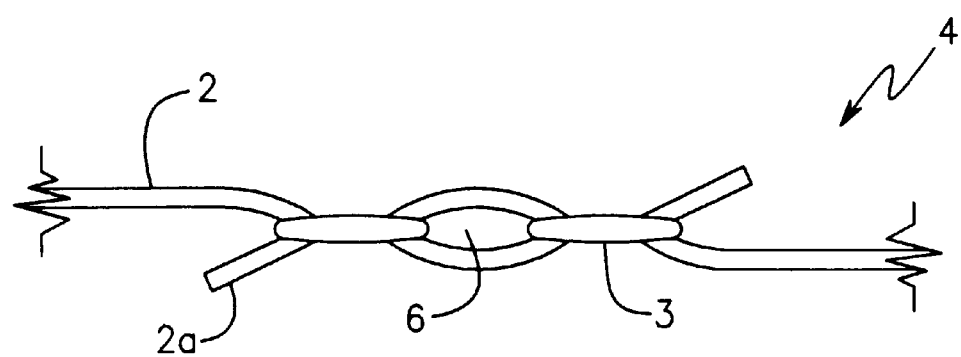
FIG. 3 is a sectional view of prior art welded liner.
Figure 4:
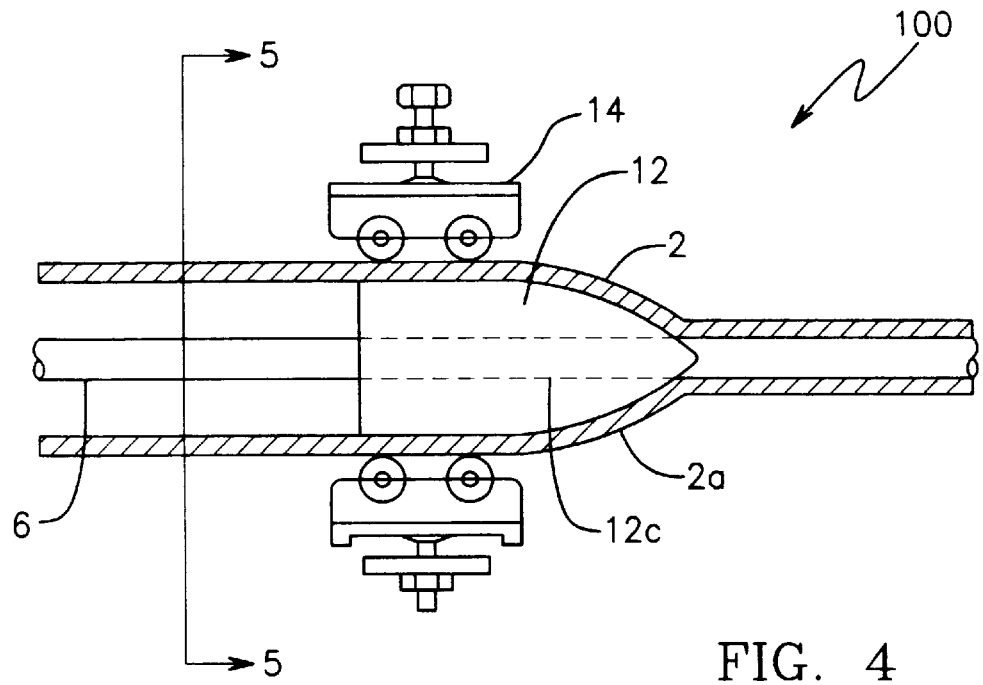
FIG. 4 is a side view of a liner welding device which embodies the present invention.
Figure 5:
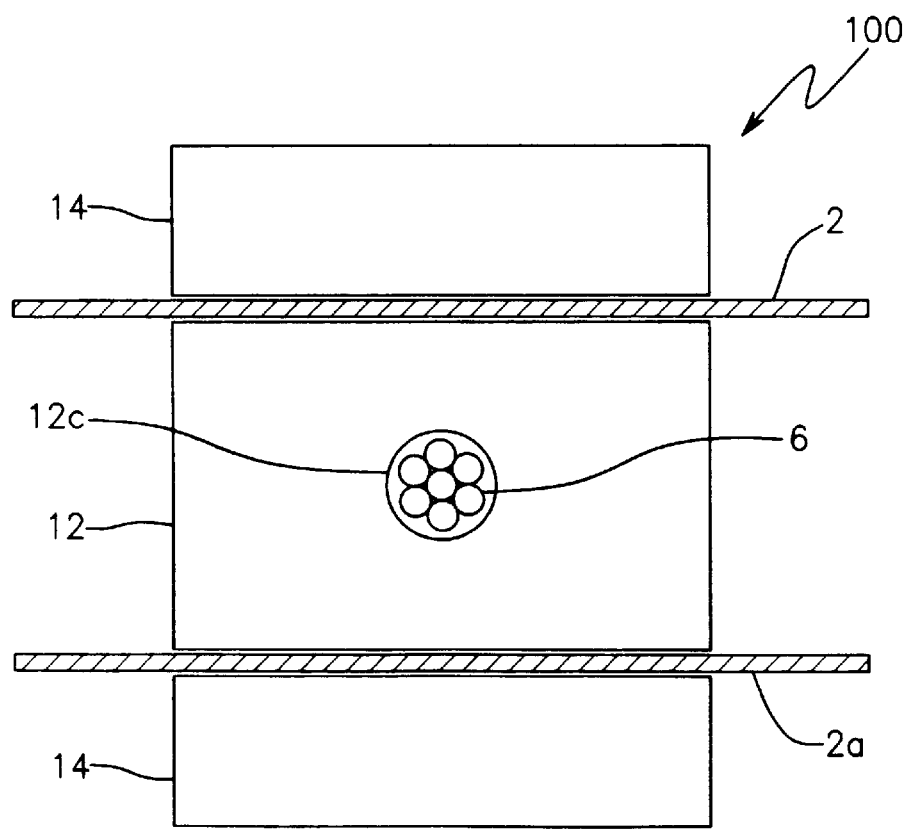
FIG. 5 is a front sectional view of the hot shoe having a central bore for conveying a cable.

FIGS. 4, 5, and 6 illustrate a first embodiment of the "poly-cable" system 100. In this embodiment, a first and second sheet 2 (sheeting), 2a (liner) of liner material is fed through the machine described above. A hot wedge or shoe 12 is used to melt a surface portion of each sheet, so that the sheets can bind together. The material of sheet 2 can be a high density polyethylene. A passage 12c is bored through the hot shoe, allowing a bare cable 6 to be fed in between the sheets. The (contour) rollers 14 then press the sheets together, capturing the now embedded cable 6. The melted sheets bind to each other. If the cable 6 is unsheathed, the melted sheets tend to bind to the cable as well. If the cable is slidable within a sheath, the melted sheets will bind to the sheath but leave the cable free for sliding. Once the liner cools, the cable is immovable relative to the liner. In a preferred embodiment, the cable is ¼" to ⅜" steel cable; however, the cable can be any suitable material capable of supporting tension and could be rope or nylon.

FIG. 7 illustrates another method 200 of binding a cable to a liner. In this embodiment, the cable 6 is laid on top of sheet 2. A specially designed extrusion welder barrel 202 follows over the cable. The extrusion welder barrel 202 is provided with a source of meltable material. The material is melted within the barrel and extruded onto the cable. The barrel 202 has a curved die foot 204 (that could be made of TEFLON™) which can be coated with a surface treatment to prevent sticking. The extruded plastic bead 206 (or deposited weld bead) binds the cable to the sheet 2. In a preferred embodiment, the sheet and bead are both made of a high density polyethylene. The bead can be applied to the entire length of cable or to selected portions.

FIGS. 8 and 9 illustrate another method 300 of binding a cable to a liner 2a. A sheathed cable is fed through a passage 12c in the hot wedge or shoe 12. The hot shoe partially melts the sheathing and the surface of the liner. As the cable and partially melted sheathing exits the hot shoe, the sheathing and liner are pressed together by the contour rollers 14. Upon cooling, the sheathed cable is bound to the liner 2a.

Figure 10:
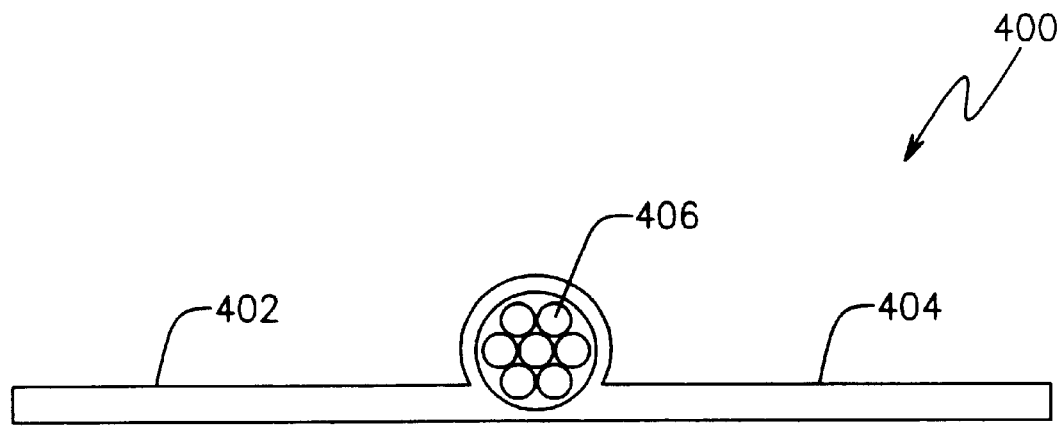
FIGS. 10 and 11 illustrate embodiments of the invention wherein a cable is captured during the liner extrusion process in either a central or eccentric position.
Figure 11:
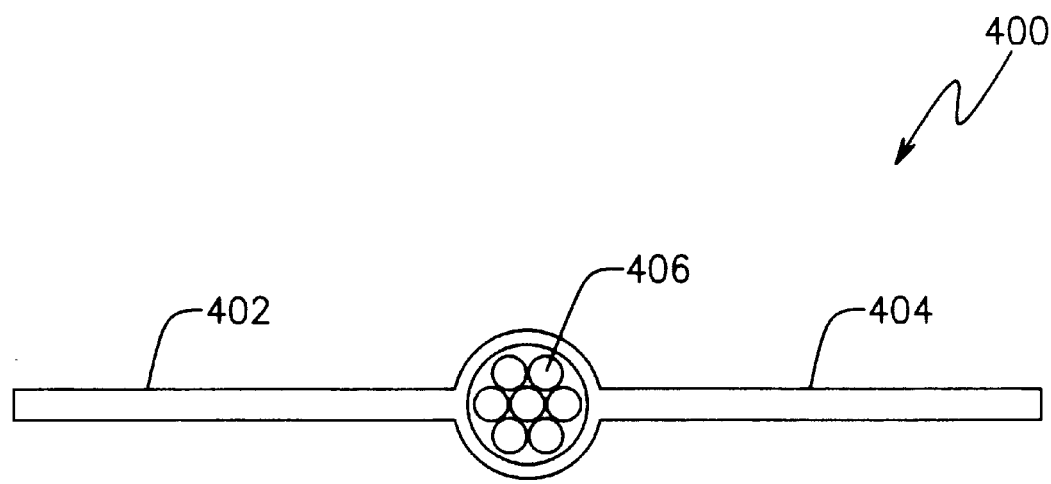

Another method of creating a liner with an integral cable involves adding the cable to a strip of liner as the liner is originally extruded. This would allow the creation of a bondable strip of liner having an integral cable already embedded therein. The bondable strip could then be bonded between two adjacent sheets, each being bonded to the strip. FIGS. 10 and 11 illustrate such a bondable strip 400. In FIG. 10, the strip 400 has a first and second wings 402, 404 and a central cable 406. The cable can be eccentric, as shown in FIG. 10, or centered as shown in FIG. 11.

Figure 12:
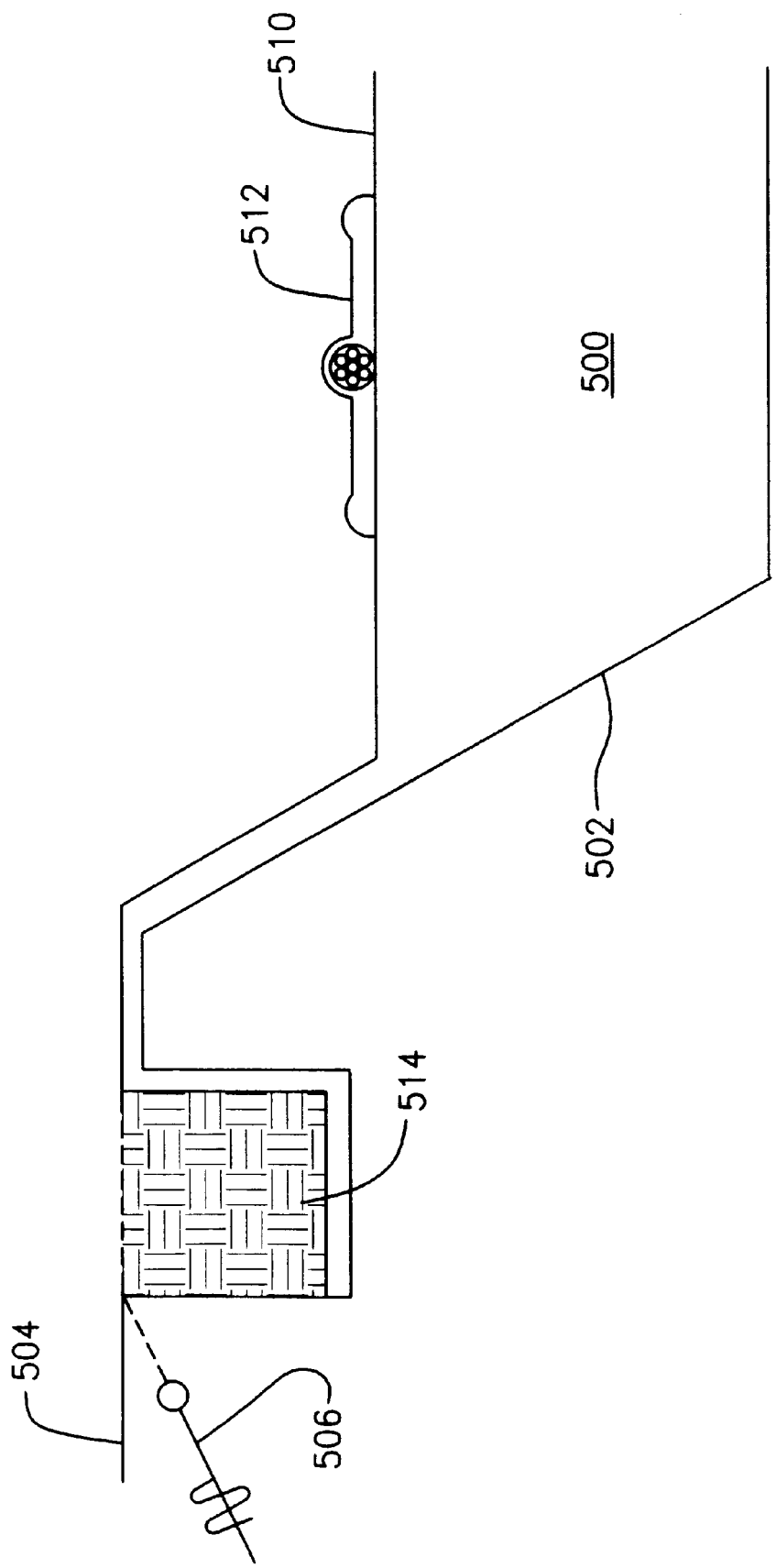
FIGS. 12 to 15 illustrate applications of a liner with integral cable.
Figure 13:
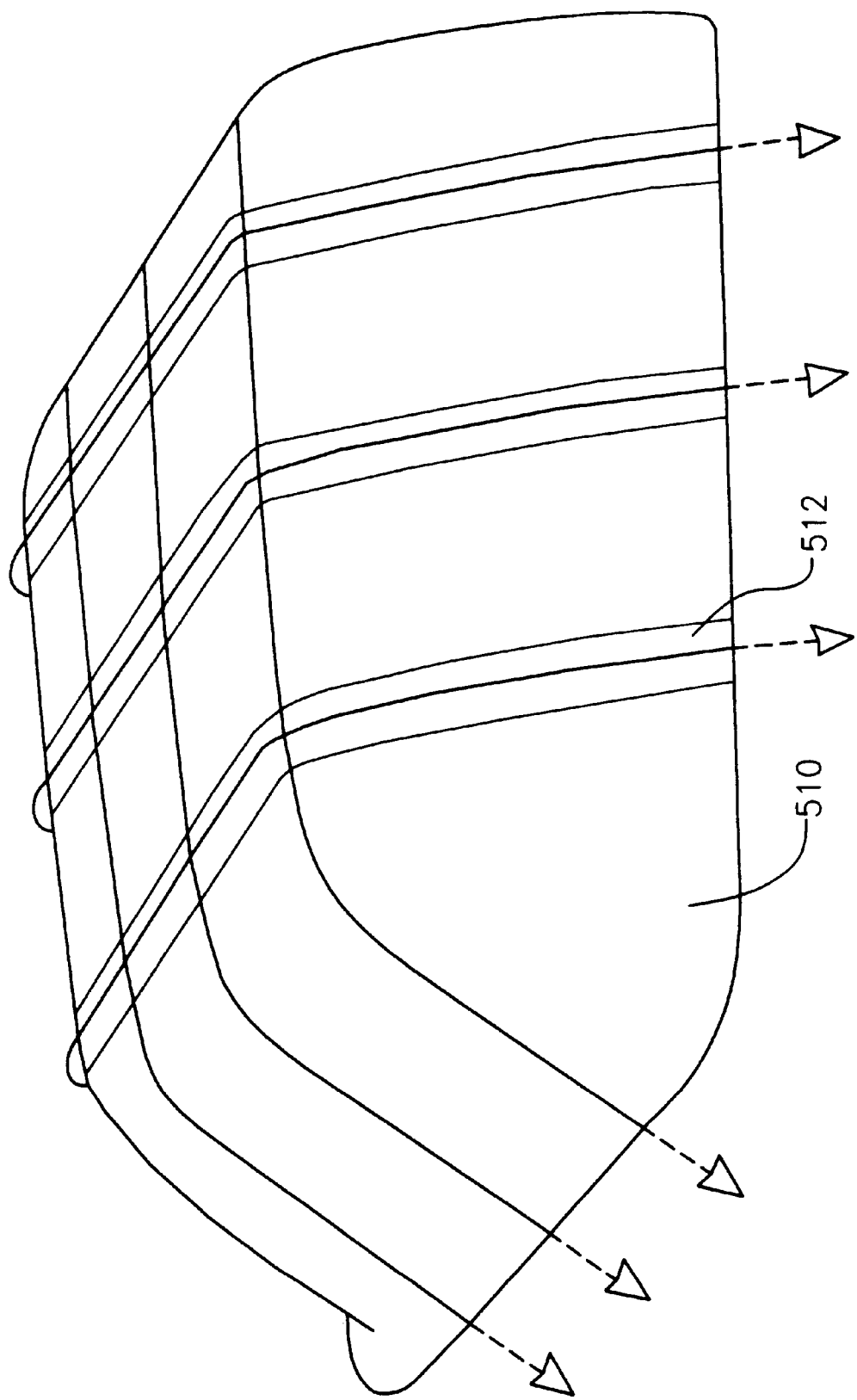

FIG. 12 illustrates an application of the liner with integral cable. A waste water pit 500 is shown having a generally sloped side wall 502. The liner 510 is composed of numerous sheets of liner material bonded together with a cable 508 integrated along the weld seam. These cables extend beyond the lateral edge 514 of the liner. As shown, the lateral edge 514 extends over level ground 504 outside the periphery of the waste water pit 500 and can be buried. The cable 508 is secured to cable anchor 506. An additional set of cables 512 can be welded to the liner 510 perpendicular to the cables 508. For example, a bondable strip such as shown in FIGS. 10 and 11 can be attached to the liner. This allows for the transverse anchoring of the sheet in addition to the anchoring 506. FIG. 13 provides a perspective of the additional transverse anchoring which can be added to the liner. While FIG. 12 illustrated the use of a cover over a waste water pit, FIG. 13 illustrates the use of the cover over a stock pile or other above ground pile.

Figure 14:
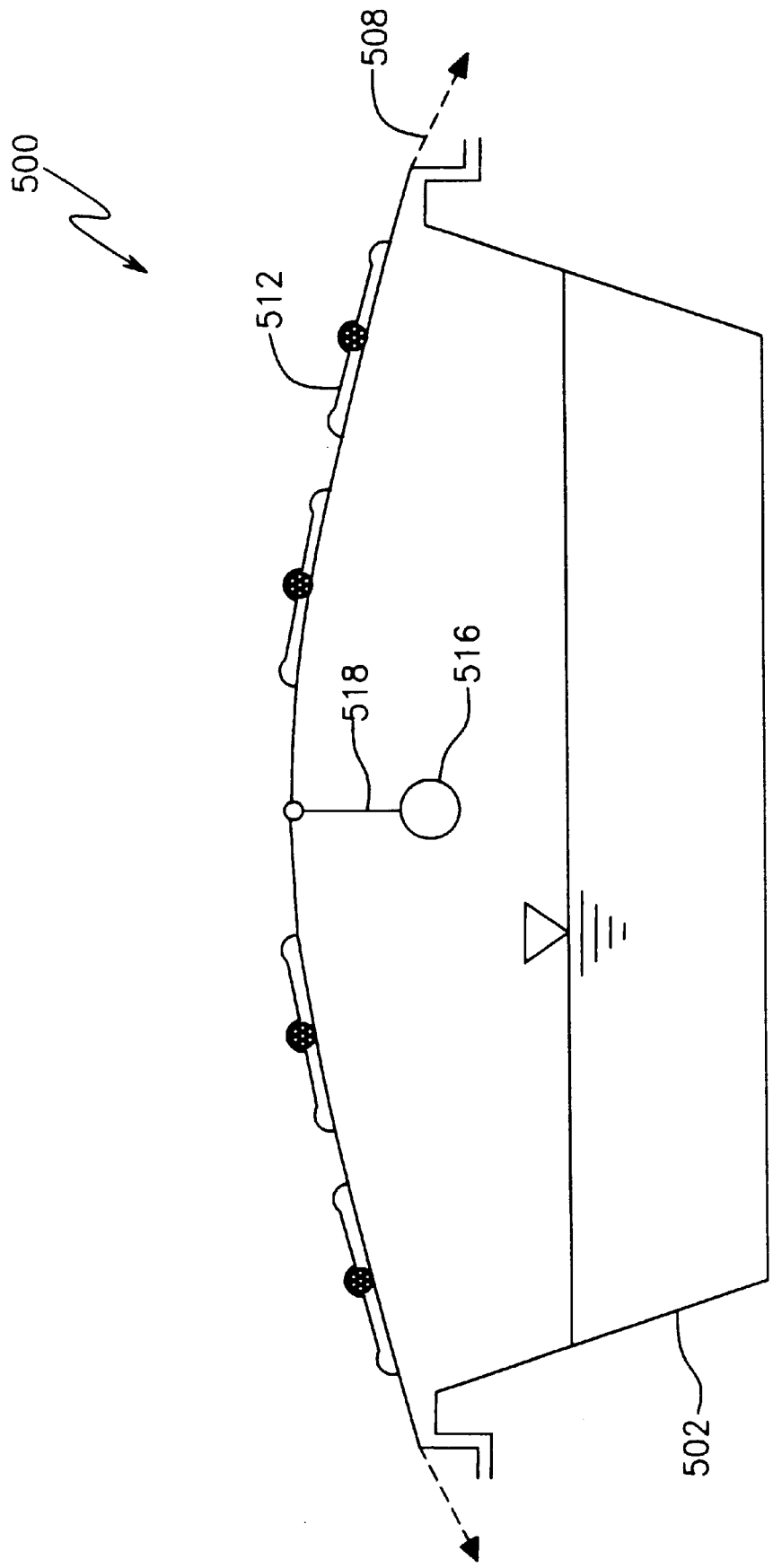
Figure 15:
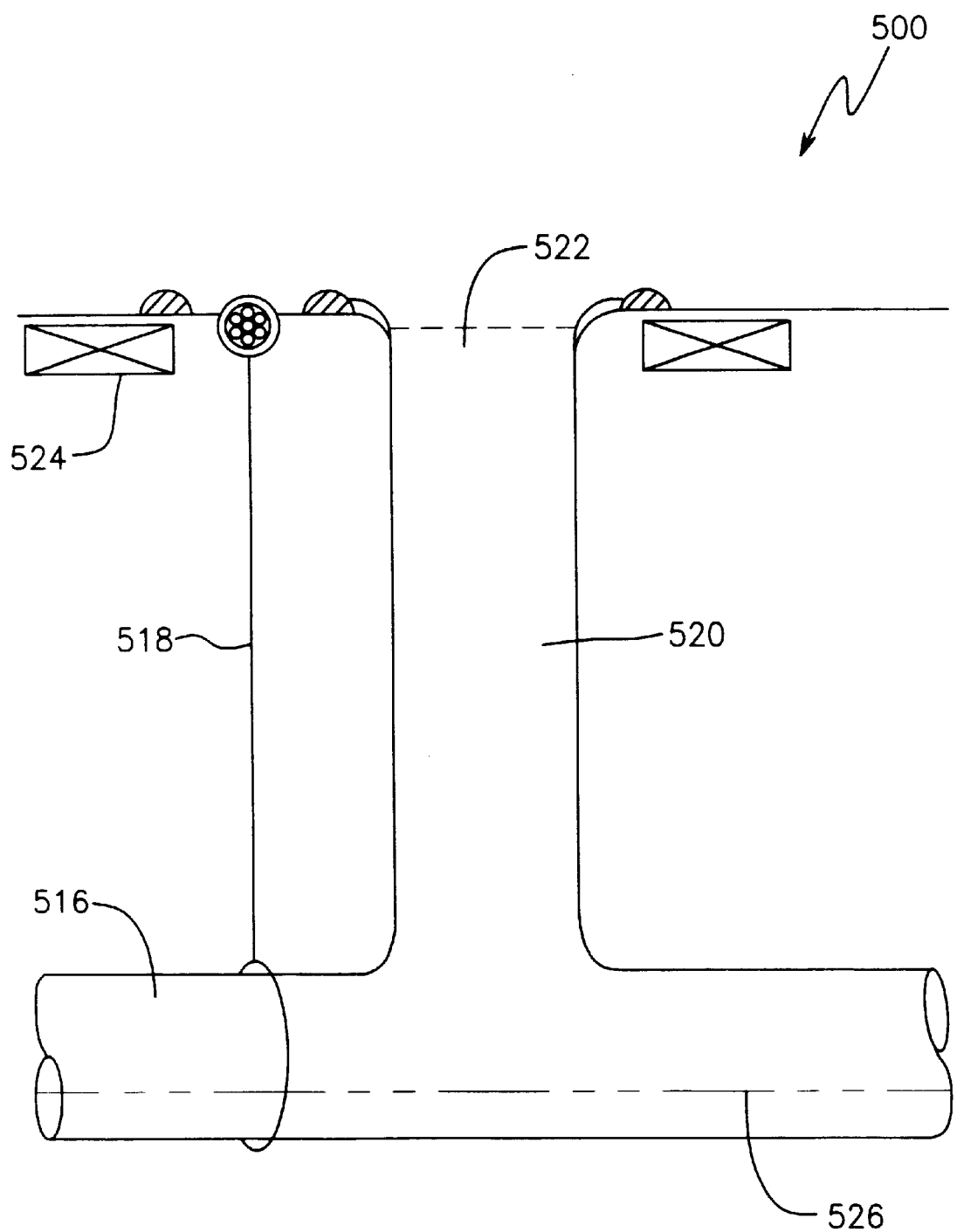

FIGS. 14 and 15 illustrate the use of a cover over a gas emitting waste water pit 500. It is a common experience that certain waste pits will inflate a liner covering the pit. As gas pressure builds under the cover, it is actually lifted off the surface of the waste water. A weight or pipe 516 can be hung from the lower surface of the liner by cable 518. The cable 518 can be secured to integral cables 508 or transverse cables 512. The pipe 516 helps ballast the liner. Further, the pipe can be used for rain water drainage as shown in FIG. 15. It must be remembered that many of the piles or pits where liners are used are in the open elements. Typically, the liner is used to prevent a hazardous waste from infiltrating the soil or to protect a valuable pond or pile from the rain or other contaminants. Rain water, in particular can accumulate on the surface of a liner. To alleviate this accumulation, a drain pipe 520 can be placed through the liner. The rain water can drain through drain 522 into the pipe 516. The pipe can be ballasted with sand 526. Floats 524 can also be attached to the lower surface of the liner. Once in the pipe 516, the rain water can drain to a sump. Again, this arrangement is viable only because of the use of cables integrated with the liner.

It will be appreciated that the detailed disclosure has been presented by way of example only and is not intended to be limiting. Various alterations, modifications and improvements will readily occur to those skilled in the art and may be practiced without departing from the spirit and scope of the invention. The invention is limited only as required by the following claims and equivalents thereto.

We claim the following invention:

1. A method of using a liner with an integrated cable, comprising:

providing a liner with an integrated cable that further comprises at least one substantially planar sheet of liner material with said cable attached to said liner material; and coupling said cable to a cable anchor.

2. The method of claim 1 further comprising two sheets of liner material, each with an overlapping edge portion welded to each other, and wherein said cable is captured between the welded overlapping portions.

3. The method of claim 1 wherein said cable is sheathed in a plastic and wherein said plastic sheath is welded to said liner material.

4. The method of claim 1 wherein said cable is captured between said liner material and an extruded bead of a plastic.

5. The method of claim 1 wherein said cable is captured between a first and a second sheet of liner material.

6. The method of claim 5 wherein said cable is centrally captured.

7. The method of claim 5 wherein said cable is eccentrically captured.

8. The method of claim 1 wherein said cable is slidably sheathed in a tube captured between a first and second sheet of liner material.

9. The method of claim 1 wherein said liner material is a polyethylene.

10. The method of claim 1 wherein cable is a steel cable.

* * * * *